(12) United States Patent
Kim et al.

(10) Patent No.: US 6,407,974 B1
(45) Date of Patent: Jun. 18, 2002

(54) OPTICAL PICK-UP APPARATUS

(75) Inventors: Young Sik Kim, Seoul; Jin Yong Kim, Kyunggi-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/233,072

(22) Filed: Jan. 19, 1999

(30) Foreign Application Priority Data

Jan. 16, 1998 (KR) .......................................... P98-1276

(51) Int. Cl.$^7$ ................................................. G11B 7/00
(52) U.S. Cl. ............................ 369/112.29; 369/112.28; 369/94; 369/44.23
(58) Field of Search ........................ 369/112, 94, 44.23, 369/110, 44.37, 112.28, 112.29, 112.2, 112.21, 112.01

(56) References Cited

U.S. PATENT DOCUMENTS

| | | | | |
|---|---|---|---|---|
| 5,912,868 A | * | 6/1999 | Hayashi et al. | ............... 369/94 |
| 5,933,401 A | * | 8/1999 | Lee et al. | ...................... 369/94 |
| 5,974,020 A | * | 10/1999 | Ju et al. | ...................... 369/112 |
| 5,999,509 A | * | 12/1999 | Sugiura et al. | .......... 369/44.23 |
| 6,081,498 A | * | 6/2000 | Yoo et al. | .................... 369/112 |
| 6,084,845 A | * | 7/2000 | Mizuno | ...................... 369/112 |

* cited by examiner

*Primary Examiner*—Thang V. Tran
(74) *Attorney, Agent, or Firm*—Birch, Stewart, Kolasch & Birch LLP

(57) ABSTRACT

An optical pick-up apparatus capable of reducing an aberration having a simplified configuration of optical elements. The optical pick-up apparatus employees a dichroic optical element for forcing first and second light beams from first and second light sources to enter toward an objective lens along an identified path. The dichroic optical element compensates the aberration. As a result, the aberration of the optical pick-up apparatus is optimized.

6 Claims, 5 Drawing Sheets

OPTICAL PICK-UP APPARATUS

BACKGROUND OF THE INVENTION

1. Field of the Invention

This invention relates to an optical pick-up apparatus adapted to access different disks.

2. Description of the Related Art

An optical disc such as CD (Compact disc) and CD-R (CD-Recordable) is used to store audio, video and digital text information, as a recording medium. In recent years, optical discs have been developed to record larger amounts of information. To this end, there has become recently appeared a DVD (Digital Versatile Disc) capable of recording an amount of information relative to the CD and CD-R. A DVD is not only higher than the CD and CD-R in track density, but also shorter than those in a distance extending from the disc surface to the recording layer. The distance between the disc surface and the recording layer in a DVD is 0.6 mm while that in the CD and CD-R is 1.2 mm. Also, the recording layer of the DVD has characteristics different from that of the CD and CD-R. Due to such the structural differences with CD and CD-R, the DVD demands an optical pick-up apparatus different from the optical pick-up apparatus for the CD and CD-R. There are optical pick-up apparatuses for the DVD and for the CD and CD-R.

Optical pick-up apparatus are used to access the CD and CD-R as well as the DVD. Such a combined optical pick-up apparatus is shown in FIG. 1. The combined optical pick-up apparatus of FIG. 1 includes an objective lens 18 for allowing light beams B1 and B2 from a laser diode 12 and a hologram module 16 to be irradiated on the recording layer 10A or 10B of a disc 10, and a photo detector 14 for detecting light reflected by the information recording layer 10A or 10B of the disc 10. First information recording layer 10A represents the recording layer of a DVD, while second information recording layer 10B represents the recording layer of a CD or CD-R. The laser diode 12 generates a first light beam B1 having a wavelength of 650 nm adaptable to access the DVD. The photo detector 14 converts light reflected by the recording layer 10B of the DVD into an electrical signal. The hologram module 16 includes a laser diode (not shown) and a photo detector (not shown). The laser diode of hologram module 16 generates a second light beam B2 having a wavelength of 780 nm adaptable to access the CD and CD-R. The photo detector of the hologram module 16 detects the light reflected by the recording layer 10A of the CD or CD-R. A first beam splitter 20, a collimator 22 and a reflective mirror 24 are installed between the laser diode 12, the hologram module 16 and the objective lens 18. The first beam splitter 20 allows the first light beam B1 from the laser diode 12 and the second light beam B2 from the hologram module 16 to proceed in an identified path. To this end, the first beam splitter 20 not only reflects perpendicularly the first light beam B1 from the laser diode 12, but also passes the second light beam B2 from the hologram module 16. The collimator 22 forces the first and second light beams B1 and B2 each divergently transmitted from the first beam splitter 20 to proceed in parallel. The reflective mirror 24 reflects perpendicularly the first and second light beams B1 and B2 from the collimator 22 toward the objective lens 18. The objective lens 18 enables the first light beam B1 from the reflective mirror 24 to be irradiated on the first recording layer 10A of the disc 10 in the shape of a spot when the first light beam B1 is applied. Then, the DVD is normally accessed. If the second light beam B2 is input, the objective lens 18 irradiates the second light beam B2 from the reflective mirror 24 on the second recording layer 10B of the disc 10 such that the CD or CD-R is normally accessed. A second beam splitter 26 allows the light beam reflected by the disc 10 to be separately transmitted to the photo detector of the hologram module 16 and the photo detector 14, respectively. To this end, the second beam splitter 26 causes a part of the light beam from the collimator 22 to be passed toward the photo detector 14 and reflects perpendicularly the rest of the light beam from the collimator 22 toward the first beam splitter 20. The sense lens 28 converges the light beam to be proceeded from the second beam splitter 26 to the photo detector 14.

As described the above, the optical pick-up apparatus of FIG. 1 employs several optical elements for combining the optical systems for the CD/CD-R and DVD. In the optical pick-up apparatus, an aberration in the entire light path is great because the optical elements each generates an aberration. Also, the total aberration produced by the optical elements is greatest due to the combined manufacturing tolerance for each element. Consequently, the combined optical pick-up apparatus does not access accurately all the DVD, CD and CD-R.

SUMMARY OF THE INVENTION

Accordingly, it is an object of the present invention to provide an optical pick-up apparatus capable of accessing different discs with reduced aberration.

It is another object of the present invention to provide an optical pick-up apparatus capable of accessing different discs with a simplified configuration of elements.

In order to obtain the objects of the invention, according to one aspect of the present invention, an optical pick-up apparatus comprises: first light source for generating first light beam having first wavelength; second light source for generating second light beam having second wavelength; an objective lens for converging the first and second light beams on the recording layer of a recording medium in the shape of a spot; and a dichroic optical element for forcing the first and second light beams from the first and second light sources to proceed toward the objective lens along an identified path.

Further, according to other aspect of the present invention, an optical pick-up apparatus comprises: first light source for generating first light beam having first wavelength; second light source for generating second light beam having second wavelength; an objective lens for converging the first and second light beams on the recording layer of a recording medium in the shape of a spot; first and second photo detectors for detecting the first and second light beams reflected by the recording layer of the recording medium, respectively; and a dichroic optical element for forcing the first and second light beams from the first and second light sources to proceed toward the objective lens along an identified path and for distributing the light beam from the objective lens to the first and second photo detectors.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
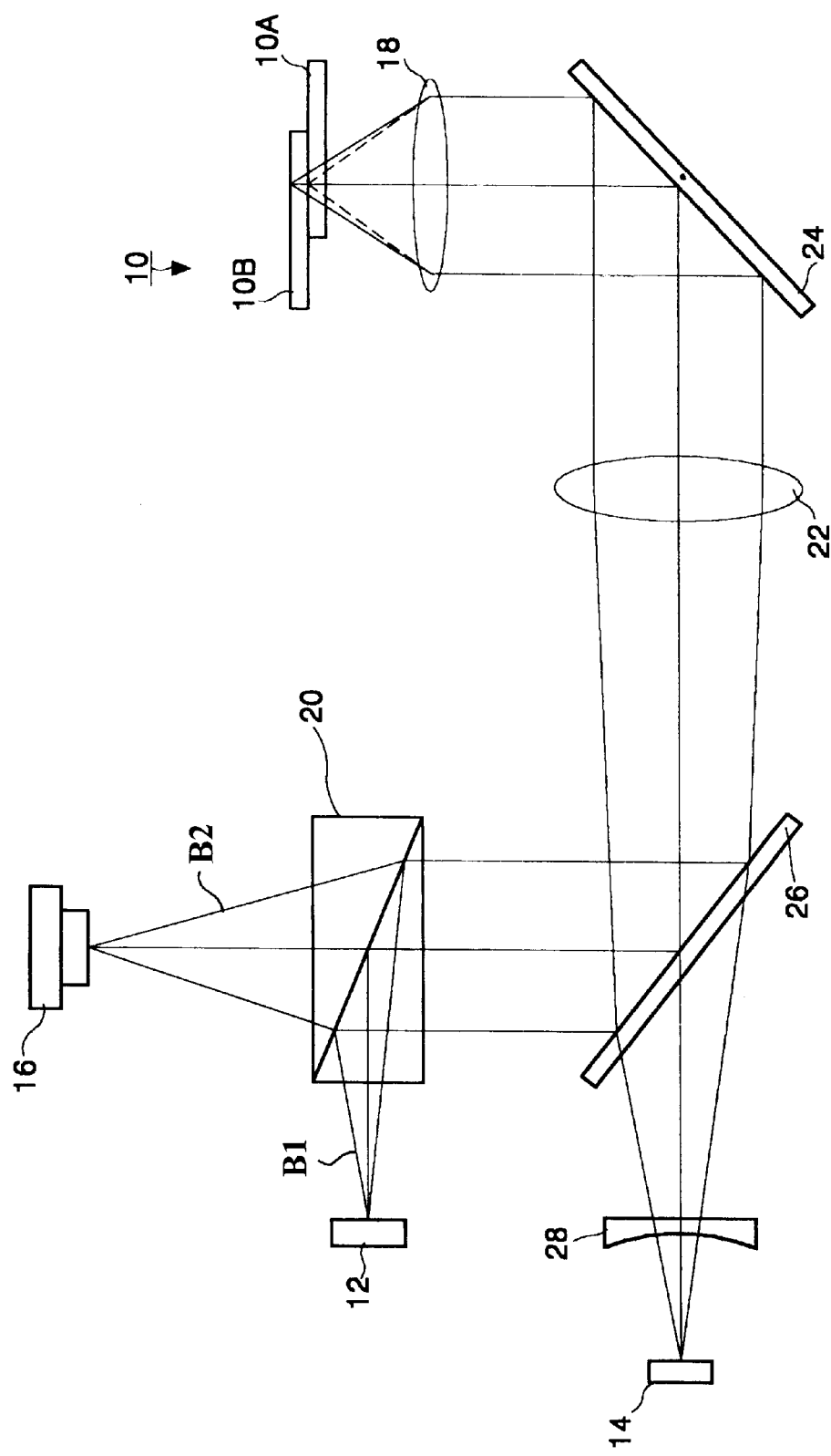
FIG. 1 is a schematic view of a related art optical pick-up apparatus.
Figure 2:
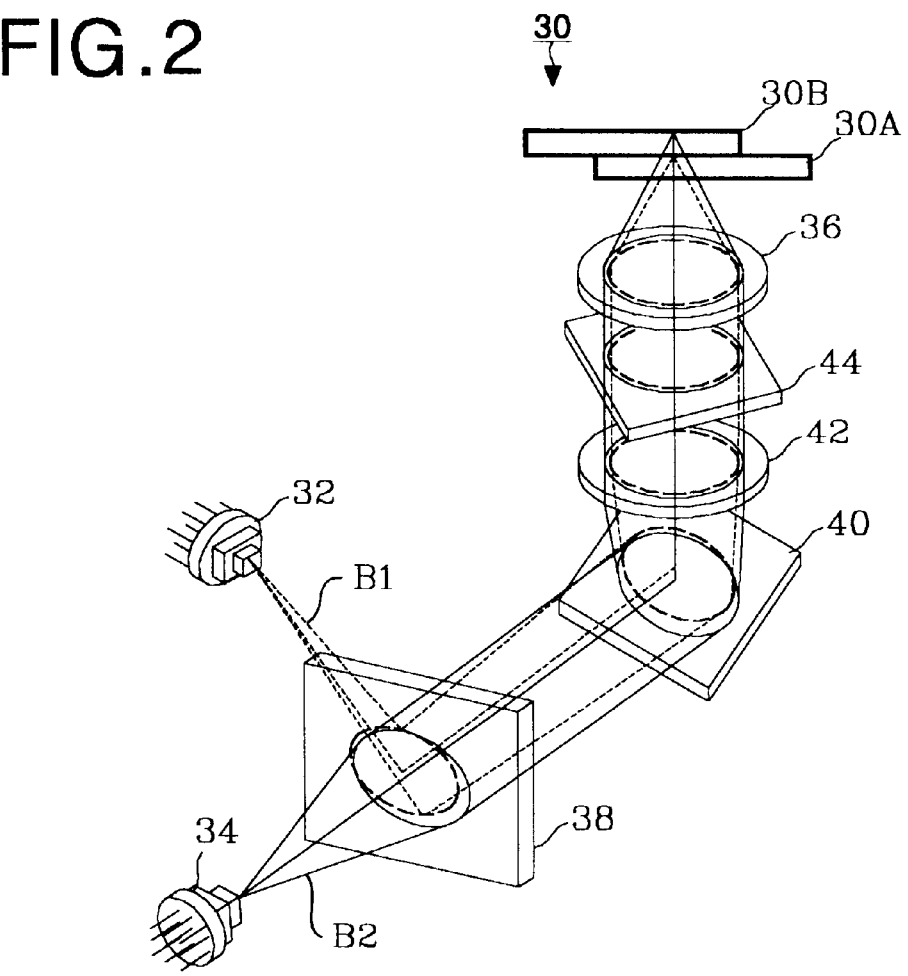
FIG. 2 is a schematic view of an optical pick-up apparatus according to an embodiment of the present invention.

FIG. 2 illustrates an optical pick-up apparatus according to the present invention. The optical pick-up apparatus of FIG. 2 includes an objective lens 36 allowing first and second light beams B1 and B2, from first and second hologram modules 32 and 34 to be irradiated on the first or second recording layer 30A or 30B of a disc 30 in the shape of a spot. The first recording layer 30A is a recording layer of a DVD, while the second recording layer 30B represents recording layers of a CD and/or CD-R. The first and second hologram modules 32 and 34 each have a light source and a photo detector. The light source included in the first hologram module 32 generates the first light beam B1 adaptive to the accession of the DVD, while the light source of the second hologram module 34. emits the second light beam B2 to be used for accessing the CD and CD-R. To this end, the first light beam B1 includes lights have a wavelength of 650 nm and the second light beam B2 consists of lights having a wavelength of 780 nm. The first light beam B1 is irradiated on the first recording layer 30A, i.e. on the recording layer of the DVD, in the shape of the spot. The second light beam B2 is irradiated on the second recording layer 30B, on the recording layers of the CD and CD-R, in the shape of the spot. The photo detector of the first hologram module 32 converts lights reflected by the first recording layer 30A into an electrical signal, and the photo detector of the second hologram module 34 detects the amount of light reflected. by the second recording layer 30B. The objective lens 36 forces the first light beam B1 to be irradiated on the first recording layer 30A in the shape of the spot when the first light beam B1 is input. The first light beam B1 then accesses normally the DVD. If the second light beam B2 is input, the objective lens 36 converges the second light beam B2 on the second recording layer 30B in the shape of the spot such that the CD and CD-R are normally accessed.

In FIG. 2, a dichroic beam splitter 38, a dichroic mirror 40, a collimator 42 and a color filter 44 are sequentially arranged between the objective lens 36, and the first and second hologram modules 32 and 34. The dichroic beam splitter 38 is disposed on a line proceeding from the second hologram module 34 to the dichroic mirror 40 to receive the first light beam B1 from the first hologram module 34 toward its rear plane. The dichroic beam splitter 38 transmits second light beam B2 from the second hologram module 34 toward the dichroic mirror 40 and reflects the first light beam B1 from the first hologram module 32 toward the dichroic mirror 40, thereby uniting the paths of the first and second light beams B1 and B2. In the other words, the dichroic beam splitter 38 transmits the second light beam B2 having the wavelength of 780 nm, while reflecting the first light beam B1 having the wavelength of 650 nm. To this end, the dichroic beam splitter 38 has a dichroic film (or a dichroic layer) formed on its front plane. Alternatively, a magnesium fluoride MgF2 and a zinc sulfide ZnS coating may form the dichroic film.

The first light beam B1 from the first hologram module 32 is refracted at the rear plane of the dichroic beam splitter 38 before arriving at the front plane of the dichroic beam splitter 38. Also, the first light beam B1 passes through the rear plane of the dichroic beam splitter 38 after reflection by the front plane of the dichroic beam splitter 38. As a result, the paths of the first and second light beams B1 and B2 generated by the first and second hologram modules 32 and 34 are aligned. In contrast, the first light beam B1 is reflected by the front plane of the dichroic beam splitter 38 after passing through the rear plane of the dichroic beam splitter 38. Then, the first light beam B1 reflected by the front plane is refracted at the rear plane of the dichroic beam splitter 38 before proceeding toward the first hologram module 32. Meanwhile, since the second light beam B2 passes through all the front and rear planes of the dichroic beam splitter 38 in original, the second light beam B2 from the second hologram module 34 is applied to the dichroic mirror 40 and the second light beam B2 from the dichroic mirror 40 is supplied to the photo detector of the second hologram module 34.

Figure 3:
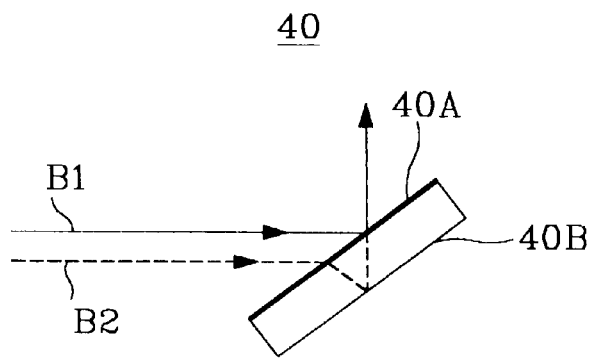
FIG. 3 is a detailed view of explaining a dichroic mirror shown in FIG. 2.

The dichroic mirror 40 has a selectively reflecting plane 40A and an entire reflecting plane 40B, as shown in FIG. 3. The selectively reflecting plane 40A and the entire reflecting plane 40B are formed on the top and bottom planes of the dichroic mirror 40, respectively. The selectively reflecting plane 40A has a dichroic film (or dichroic layer) formed by applying a magnesium fluoride MgF2 and the zinc sulfide ZnS coating. Therefore, the selectively reflecting plane 40A reflects perpendicularly the first light beam B1 having the wavelength of 650 nm while transmitting the second light beam B2 having the wavelength of 780 nm. By the selectively reflecting plane 40A, the dichroic mirror 40 forces the first light beam B1 from the dichroic beam splitter 38 to proceed toward the collimator 42 and reflects the first light beam B1 from the collimator 42 toward the dichroic beam splitter 38. The entire reflecting plane 40B also reflects the second light beam B2 through the selectively reflecting plane 40A. In detail, the second light beam B2 from the dichroic beam splitter 38 is reflected by the entire reflecting plane 40B after being refracted at the selectively reflecting plane 40A, thereby proceeding toward the collimator 42. Also, the second light beam B2 from the collimator 42 is reflected by the entire reflecting plane 40B and refracted at the selectively reflecting plane 40A, after passing through the selectively reflecting plane 40A, to proceed toward the dichroic beam splitter 38. By using the entire reflecting plane 40B, the dichroic mirror 40 compensates or corrects for the aberration of the second light beam B2 generated by the dichroic beam splitter 38.

The collimator 42 allows the light beams B1 and B2 entered divergently from the dichroic mirror 40 to proceed toward the color filter 44 in parallel. The color filter 44 adjusts selectively the flux diameters of the light beams to proceed from the collimator 42 to the objective lens 36 according to the wavelengths of the light beams. To this end, the color filter 44 has an organic dye film or layer coated on its edge area. The organic dye film transmits only a light beam having a predetermined wavelength on the basis of the spectral characteristics. In other words, the organic dye film transmits the first light beam B1 having the wavelength of 650 nm, while shutting off the second light beam B2 having the wavelength of 780 nm. By the color filter 44, the flux diameter of the first light beam B1 is great, while the flux diameter of the second light beam B2 has a small value. That is, the aperture of the objective lens is enlarged when that the first light beam B1 enters, while the aperture of the objective lens 36 is small when the second light beam B2 enters. The first light beam B1 is converged by the objective lens 36 on the first recording layer 30A of the disc 30 in the shape of the spot such that the DVD is normally accessed. The second light beam B2 is irradiated on the second recording layer 30B of the disc 30 in the shape of the spot by the objective lens 36 such that the CD and CD-R are normally accessed.

In the optical pick-up apparatus according to the present invention, as shown in FIG. 2, since the optical systems for the DVD and CD/CD-R are combined using only the dichroic beam splitter 38, the total number of optical elements decreases in number. As a result, the total aberration generated in the optical pick-up apparatus according to the present invention is small. Also, the aberration is corrected or compensated by the dichroic mirror 40. Furthermore, in the optical pick-up apparatus according to the present invention, the manufacturing cost decreases and the manufacturing process is simplified.

Figure 4:
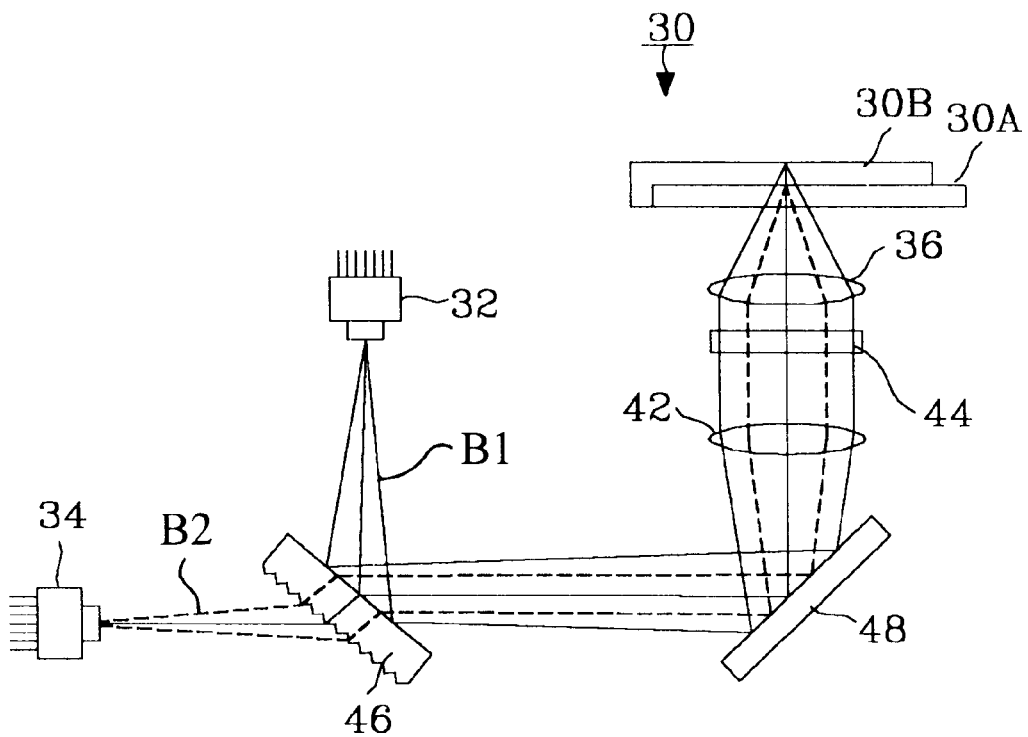
FIG. 4 is a schematic view of an optical pick-up apparatus according to another embodiment of the present invention.

Referring to FIG. 4, there is illustrated another optical pick-up apparatus according to the present invention. The optical pick-up apparatus of FIG. 4 includes an objective lens 36 passing first and second light beams B1 and B2 from first and second hologram modules 32 and 34 to be irradiated on the first and second recording layer 30A and 30B of a disc 30 in the shape of a spot. The first recording layer 30A is a recording layer of a DVD, while the second recording layer 30B represents recording layers of a CD and CD-R. The first and second hologram modules 32 and 34 each have a light source (not shown) and a photo detector (not shown). The light source included in the first hologram module 32 generates the first light beam B1 adaptive to the accession of the DVD, while the light source of the second hologram module 34 emits the second light beam B2 to be used for accessing the CD and CD-R. To this end, the first light beam B1 includes a light having a wavelength of 650 nm and the second light beam B2 consists of a light having a wavelength of 780 nm. The first light beam B1 is irradiated on the first recording layer 30A, i.e. on the recording layer of the DVD, in the shape of the spot. The second light beam B2 is irradiated on the second recording layer 30B, on the recording layers of the CD and CD-R, in the shape of the spot. The photo detector of the first hologram module 32 converts light reflected by the first recording layer 30A into an electrical signal, and the photo detector of the second hologram module 34 detects the amount of light reflected by the second recording layer 30B. The objective lens 36 forces the first light beam B1 to be irradiated on the first recording layer 30A in the shape of the spot when the first light beam B1 is input. The first light beam B1 then accesses normally the DVD. If the second light beam B2 is input, the objective lens 36 converges the second light beam B2 on the second recording layer 30B in the shape of the spot such that the CD and CD-R are normally accessed.

Figure 5:
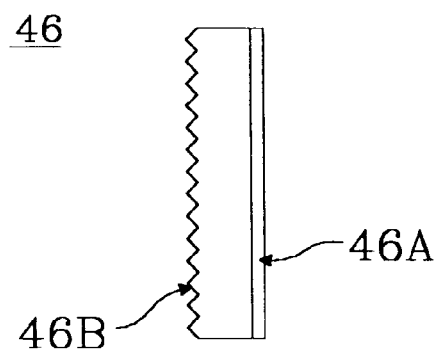
FIG. 5 is a detailed view of explaining a hologram dichroic beam splitter shown FIG. 4.

The optical pick-up apparatus of FIG. 4 includes a hologram dichroic beam splitter 46, a reflective mirror 48, a collimator 42 and a color filter 44 arranged sequentially between the objective lens 36, the first and second hologram modules 32 and 34. The hologram dichroic beam splitter 46 is installed at an angle to reflect the first light beam B1 having the wavelength of 650 nm and to transmit the second light beam B2 having the wavelength of 780 nm. As a result, all the first and second light beams B1 and B2 from the first and second hologram modules 32 and 34 proceed toward the reflective mirror 48 and the first and second light beams B1 and B2 from the reflective mirror 48 are distributed to the first and second hologram modules 32 and 34. To this end, the hologram dichroic beam splitter 46 has a dichroic film 46A coated on its rear plane, as shown in FIG. 5. The dichroic film 46A transmits the second light beam B2 having the wavelength of 780 nm, while reflects perpendicularly the first light beam B1 having the wavelength of 650 nm.

An aberration is generated by the hologram dichroic beam splitter 46 because the second light beam B2 is refracted at each of the front and rear planes of the hologram dichroic beam splitter 46. In order to correct this aberration, the hologram dichroic beam splitter 46 has a hologram pattern 46B formed on the front plane of the hologram dichroic beam splitter 46 as shown in FIG. 5. The hologram pattern 46B causes the refractive index of the front plane of the hologram dichroic beam splitter 46 to be different from that of the rear plane of the hologram dichroic beam splitter 46, thereby correcting the aberration of the second light beam B2 due to the hologram dichroic beam splitter 46.

The reflective mirror 48 reflects perpendicularly the first and second light beams B1 and B2 from the hologram dichroic beam splitter 46 toward the collimator 42. The reflective mirror 48 also reflects perpendicularly the first and second light beams B1 and B2 from the collimator 42 toward the hologram dichroic beam splitter 46. The collimator 42 allows the light beams B1 and B2 entered divergently from the reflective mirror 48 to proceed toward the color filter 44 in parallel.

The color filter 44 adjusts selectively the flux diameters of the light beams to be proceeded from the collimator 42 to the objective lens 36 according to the wavelengths of the light beams. To this end, the color filter 44 has an organic dye film or layer coated on its edge area. The organic dye film transmits only a light beam having a predetermined of wavelength on the basis of the spectral characteristics. In other words, the organic dye film transmits the first light beam B1 having the wavelength of 650 nm, while shutting off the second light beam B2 having the wavelength of 780 nm. By the color filter 44, the flux diameter of the first light beam B1 is great, while the flux diameter of the second light beam B2 has a small value. That is, the aperture of the objective lens 36 is enlarged when that the first light beam B1 enters, while the aperture of the objective lens 36 is small when the second light beam B2 enters.

The first light beam B1 is converged by the objective lens 36 on the first recording layer 30A of the disc 30 in the shape of the spot such that the DVD is normally accessed. The second light beam B2 is irradiated on the second recording layer 30B of the disc 30 in the shape of the spot by the objective lens 36 such that the CD and CD-R are normally accessed.

In the optical pick-up apparatus according to the present invention, as shown in FIG. 4, the optical systems for the DVD and CD are combined by using the hologram dichroic beam splitter 46 to decrease the total number of optical elements. As a result, the aberration generated in the optical pick-up apparatus according to the present invention is small. Also, the aberration is corrected or compensated for by the hologram dichroic beam splitter 46 such that the aberration into the optical pick-up apparatus according to the present invention is optimized. Furthermore, in the optical pick-up apparatus according to the present invention, the manufacturing cost decreases and the manufacturing process is simplified.

Figure 6:
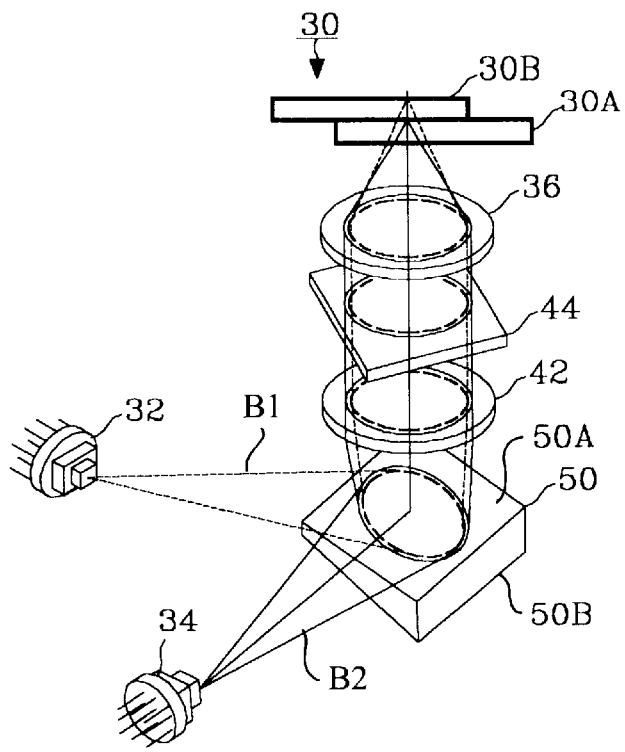
FIG. 6 is a schematic view of an optical pick-up apparatus according to another embodiment of the present invention.

FIG. 6 shows another optical pick-up apparatus according to the present invention. The optical pick-up apparatus of FIG. 6 includes an objective lens 36 allowing first and second light beams B1 and B2 from first and second hologram modules 32 and 34 to be irradiated on the first and second recording layers 30A and 30B of a disc 30 in the shape of a spot. The first recording layer 30A is a recording layer of a DVD, while the second recording layer 30B represents recording layers of a CD and CD-R. The first and second hologram modules 32 and 34 each have a light source (not shown) and a photo detector (not shown). The light source included in the first hologram module 32 generates the first light beam B1 adaptive to the accession of the DVD, while the light source of the second hologram module 34 emits the second light beam B2 to be used for accessing the CD and CD-R. The first light beam B1 includes light having a wavelength of 650 nm and the second light beam B2 consists of light having a wavelength of 780 nm. The first light beam B1 is irradiated on the first recording layer 30A, i.e. on the recording layer of the DVD, in the shape of the spot. The second light beam B2 is irradiated on the second recording layer 30B, on the recording layers of the CD and CD-R, in the shape of the spot. The photo detector of the first hologram module 32 converts light reflected by the first recording layer 30A into an electrical signal, and the photo detector of the second hologram module 34 detects the amount of lights reflected by the second recording layer 30B. The objective lens 36 forces the first light beam B1 to be irradiated on the first recording layer 30A in the. shape of the spot when the first light beam B1 is input. The first light beam B1 then accesses normally the DVD. If the second light beam B2 is input, the objective lens 36 converges the second light beam B2 on the second recording layer 30B in the shape of the spot such that the CD and CD-R are normally accessed.

In the optical pick-up apparatus of FIG. 6, a dichroic wedge mirror 50, a collimator 42 and a color filter 44 are installed between the objective lens 36, the first and second hologram modules 32 and 34. The dichroic wedge mirror 50 has a wedge plane 50A and an entire reflecting plane 50B each positioned on its top and bottom planes. On the wedge plane 50A, a dichroic film is applied by coating alternatively with magnesium fluoride MgF2 or zinc sulfide ZnS. The wedge plane 50A reflects the first light beam B1 having the wavelength of 650 nm and transmits the second light beam B2 having the wavelength of 780 nm. By the wedge plane 50A, the first light beam B1 from the first hologram module 32 is applied to the collimator 42 and the first light beam B1 also proceeds to the first hologram module 32. To this end, the first hologram module 32 is disposed on a line which proceeds from the wedge plane 50A toward the direction of 45°. Meanwhile, the entire reflecting plane 50B reflects the second light beam B2 passing through the wedge plane 50A. In detail, the entire reflecting plane 50B reflects the second light beam B2 through the wedge plane 50A. In detail, the second light beam B2 from the second hologram module 34 is reflected by the entire reflecting plane 50B after being refracted at the wedge plane 50A, thereby proceeding toward the collimator 42. Also, the second light beam B2 from the collimator 42 is reflected by the entire reflecting plane 50B and refracted at the wedge plane 50A, after passing through the selectively reflecting plane 40A, thereby proceeding toward the second hologram module 34. Using the entire reflecting plane 50B, the wedge dichroic mirror 50 compensates or corrects the aberration of the second light beam B2 generated due to the second hologram module 34 being at the location different from the first hologram module 32. The collimator 42 allows the light beams B1 and B2 entered divergently from the dichroic wedge mirror 50 to proceed toward the color filter 44 in parallel.

The color filter 44 adjusts selectively the flux diameters of the light beams to be proceeded from the collimator 42 to the objective lens 36 according to the wavelengths of the light beams. To this end, the color filter 44 has an organic dye film or layer coated on its edge area. The organic dye film only transmits light having a predetermined wavelength on the basis of the spectral characteristics. In the other words, the organic dye film transmits the first light beam B1 having the wavelength of 650 nm, while shutting off the second light beam B2 having the wavelength of 780 nm. By the color filter 44, the flux diameter of the first light beam B1 is great, while the flux diameter of the second light beam B2 has a small value. That is, the aperture of the objective lens 36 is enlarged when the first light beam B1 enters, while the aperture of the objective lens 36 is small when the second light beam B2 enters. Therefore, the first light beam B1 is converged by the objective lens 36 on the first recording layer 30A of the disc 30 in the shape of the spot such that the DVD is normally accessed. The second light beam B2 is irradiated on the second recording layer 30B of the disc 30 in the shape of the spot by the objective lens 36 such that the CD and CD-R are normally accessed.

In the optical pick-up apparatus according to the present invention, as shown in FIG. 6, since the optical systems for the DVD and CD are combined using the dichroic wedge mirror 50, the total number of optical elements decrease in number. As a result, the aberration generated in the optical pick-up apparatus according to the present invention is comparatively smaller. Furthermore, in the optical pick-up apparatus according to the present invention, the manufacturing cost decreases and the manufacturing process is simplified.

Figure 7:
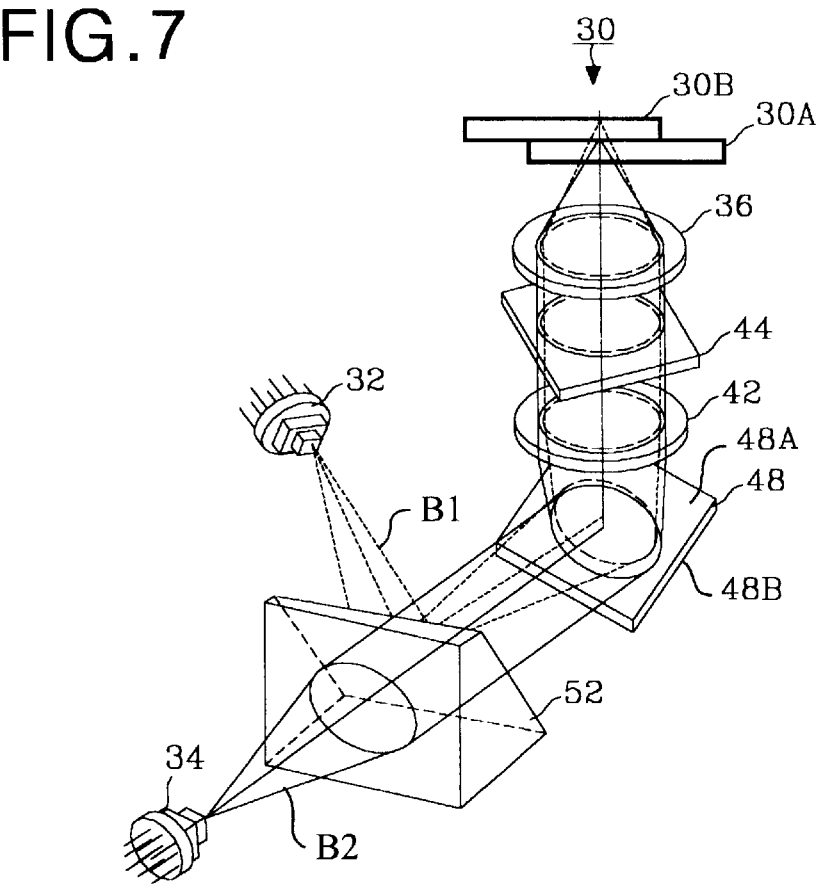
FIG. 7 is a schematic view of an optical pick-up apparatus according to another embodiment of the present invention.

FIG. 7 illustrates another optical pick-up apparatus according to the present invention. The optical pick-up apparatus of FIG. 7 is similar to that of FIG. 4 except a dichroic wedge plate 52 replaces the hologram dichroic beam splitter 46. The dichroic wedge plate 52 is installed on a line proceeding from the second hologram module 34 to the reflective mirror 48 to receive the first light beam B1 from the first hologram module 32 on its rear plane. The dichroic wedge plate 52 transmits second light beam B2 from the second hologram module 34 toward the reflective mirror 48 and reflects the first light beam B1 from the first hologram module 32 toward the reflective mirror 48, thereby uniting the paths of the first and second light beams B1 and B2. In other words, the dichroic wedge plate 52 transmits the second light beam B2 having the wavelength of 780 nm, while reflects the first light beam B1 having the wavelength of 650 nm. To this end, the dichroic wedge plate 52 has a dichroic film formed on its front plane. The first light beam B1 from the first hologram module 32 is refracted at the rear plane of the dichroic wedge plate 52 before reflected by the dichroic film of the dichroic wedge plate 52. The first light beam B1 reflected by the dichroic film proceeds toward the reflective mirror 48 after re-refracting at the rear plane of the dichroic wedge plate 52. As a result, the paths of the first and second light beams B1 and B2 generated in the first and second hologram modules 32 and 34 are aligned.

In contrast, the first light beam B1 from the reflective mirror 48 is reflected by the dichroic film after refracting at the rear plane of the dichroic wedge plate 52. Then, the first light beam B1 reflected by the front plane is refracted at the rear plane of the dichroic wedge plate 52 before proceeding toward the first hologram module 32. Consequently, the first and second light beams B1 and B2 from the reflective mirror 48 are distributed to the first and second hologram modules 32 and 34 by the dichroic wedge plate 52. Meanwhile, since the second light beam B2 passes through all the front and rear planes of the dichroic wedge plate 52 in original, the second light beam B2 from the second hologram module 34 is applied to the reflective mirror 48 and the second light beam B2 from the reflective mirror 48 is irradiated on the photo detector of the second hologram module 34. However, the aberration is generated by the dichroic wedge plate 52 because the second light beam B2 passes through the hologram dichroic beam splitter 46. In order to correct the aberration, the wedge plane is formed on the rear plane of the dichroic wedge plate 52. The wedge plane refracts the second light beam B2 from the second hologram module 34 to the reflective mirror 48. Also, the wedge plane refracts the second light beam B2 from the reflective mirror 48 to the second hologram module 34. As a result, the paths of the first and second light beams B1 and B2 proceeding toward the reflective mirror 48 are identified and the aberration of the second light beam B2 is corrected.

In the optical pick-up apparatus according to the present invention, as shown in FIG. 7, since the optical systems for the DVD and CD are combined by using the dichroic wedge plate 52, the total number of optical elements decrease in number. As a result, the aberration generated in the optical pick-up apparatus according to the present invention is small. Also, the aberration is corrected or compensated by the dichroic wedge plate 52 such that the aberration into the optical pick-up apparatus according to the present invention is optimized. Furthermore, in the optical pick-up apparatus according to the present invention, the manufacturing cost decreases and the manufacturing process is simplified.

Figure 8:
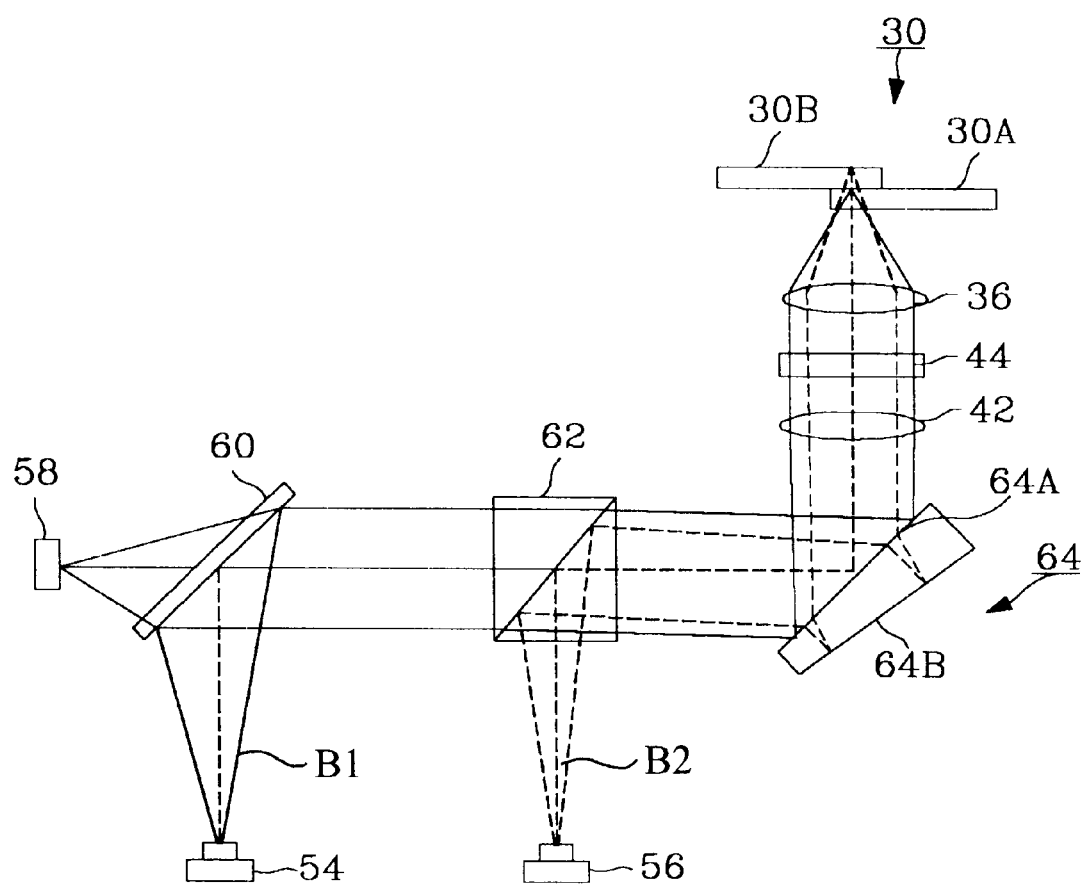
FIG. 8 is a schematic view of an optical pick-up apparatus according to another embodiment of the present invention.

Referring to FIG. 8, there is illustrated another optical pick-up apparatus according to the present invention. The optical pick-up apparatus of FIG. 8 includes an objective lens 36 for allowing light beams B1 and B2 from a laser diode 54 and a hologram module 56 to be irradiated on the recording layer 30A or 30B of a disc 30, and a photo detector 58 for detecting light reflected by the recording layer 30A of the disc 30. The first recording layer 30A is the recording layer of a DVD, while the second recording layer 30B represents the recording layers of a CD and CD-R. The laser diode 54 generates a first light beam B1 having a wavelength of 650 nm adapted to access the DVD. The photo detector 58 converts lights reflected by the recording layer 30A of the DVD into an electrical signal. The hologram module 56 includes a laser diode (not shown) and a photo detector (not shown). The laser diode of hologram module 56 generates a second light beam B2 having a wavelength of 780 nm adapted to access the CD or CD-R. The photo detector of the hologram 56 detects the lights by the recording layers 30B of the CD or CD-R.

In the optical pick-up apparatus of FIG. 8, a half mirror 60 is disposed between the laser diode 54, photo detector 58 and the objective lens 36, and a beam splitter 62 is installed between the half mirror 60 and the objective lens 36. The half mirror 60 reflects a part of the first light beam B1 from the laser diode 54 toward the beam splitter 62 and transmits the rest of the first light beam B1 from the laser diode 54. Also, the half mirror 60 transmits the part of the light beam from the beam splitter 62 toward the photo detector 58 and reflects the rest of the light beam from the beam splitter 62. By using the half mirror 60, the first light beam B1 from the laser diode 54 is applied to the beam splitter 62 and the light beam from the beam splitter 62 is irradiated on the photo detector 58. The beam splitter 62 identifies the paths of the first and second light beams B1 and B2 from the laser diode 54 and the hologram module 56. To this end, the beam splitter 62 transmits the first light beam B1 from the half mirror 60 toward the objective lens 36 and reflects the rest of the first light beam B1. Also, the beam splitter 62 reflects a part of the second light beam B2 from the hologram module 56 toward the objective lens 36 and transmits the rest of the second light beam B2. Furthermore, the beam splitter 62 distributes the light beam from the objective lens 36 to the hologram module 56 and the half mirror 60. To this end, the beam splitter 62 transmits a part of the light beam from objective lens 36 to the half mirror 60 and reflects the rest of the light beam from objective lens 36 to the hologram module 56.

The optical pick-up apparatus also includes a dichroic wedge mirror 64, a collimator 42 and a color filter 44 arranged between the beam splitter 62 and the objective lens 36. The dichroic wedge mirror 64 has a selectively reflecting plane 64A and a wedge plane 64B each positioned on its top and bottom planes. The selectively reflecting plane 64A has a dichroic film formed by applying a coating of alternatively magnesium fluoride MgF2 or zinc sulfide ZnS. Therefore, the selectively reflecting plane 64A reflects the first light beam B1 having the wavelength of 650 nm and transmits the second light beam B2 having the wavelength of 780 nm. By the selectively reflecting plane 64A, the first light beam B1 from the beam splitter 62 is applied to the collimator 42 and the first light beam B1 from the collimator 42 also proceeds toward the beam splitter 62. Meanwhile, the wedge plane 64B reflects the second light beam B2 passing through the selectively reflecting plane 64A. In detail, the wedge plane 64B reflects the second light beam B2 through the wedge plane 50A. In detail, the second light beam B2 from the beam splitter 62 is reflected by the wedge plane 64B after being refracted at the selectively reflecting plane 64A, thereby proceeding toward the collimator 42. Also, the second light beam B2 from the collimator 42 is reflected by the wedge plane 64B and refracted at the selectively reflecting plane 64A, after passing through the selectively reflecting plane 64A, thereby proceeding toward the beam splitter 62. The dichroic wedge mirror 64 compensates the aberration of the second light beam B2 generated by the reflection of the beam splitter 62. The collimator 42 allows the light beams B1 and B2 entered divergently from the dichroic wedge mirror 64 to proceed toward the color filter 44 in parallel.

The color filter 44 adjusts selectively the flux diameters of the light beams to proceed from the collimator 42 to the objective lens 36 according to the wavelengths of the light beams. To this end, the color filter 44 has an organic dye film or layer coated on its edge area. The organic dye film transmits only a light beam having a predetermined of wavelength on the basis of the spectral characteristics. In other words, the organic dye film transmits the first light beam B1 having the wavelength of 650 nm, while shutting off the second light beam B2 having the wavelength of 780 nm. By the color filter 44, the flux diameter of the first light beam B1 is great, while the flux diameter of the second light beam B2 has a small value. That is, the aperture of the objective lens 36 is enlarged when the first light beam B1 enters, while the aperture of the objective lens 36 is small when the second light beam B2 enters. Therefore, the first light beam B1 is converged by the objective lens 36 on the first recording layer 30A of the disc 30 in the shape of the spot such that the DVD is normally accessed. The second light beam B2 is irradiated on the second recording layer 30B of the disc 30 in the shape of the spot by the objective lens 36 such that the CD and CD-R are normally accessed.

In the optical pick-up apparatus according to the present invention, as shown in FIG. 8, since the aberration is corrected or compensated by the dichroic wedge mirror 64 such that the aberration by the optical pick-up apparatus according to the present invention is reduced. Therefore, all the DVD, CD and CD-R is accurately accessed by the optical pick-up apparatus in accordance with the present invention.

As described above, in the optical pick-up apparatus according to the present invention, the optical systems for the DVD and CD/CD-R are reduced. Also, in the optical pick-up apparatus according to the present invention, the aberration is small and all the DVD, CD and CD-R may be accurately accessed. The manufacturing cost decreases and the manufacturing process is simplified. Furthermore, the aberration is corrected by the aberration-correcting element such that the aberration into the optical pick-up apparatus according to the present invention is minimized. As a result, the optical pick-up apparatus according to the present invention accesses more accurately the DVD, CD and CD-R.

Although the present invention has been explained by the embodiments shown in the drawing hereinbefore, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their legal equivalents.

What is claimed is:

1. An optical pick-up apparatus, comprising:
   a first light source for generating a first light beam having a first wavelength;
   a second light source for generating a second light beam having a second wavelength;
   an objective lens for converging the first and second light beams on the recording layer of a recording medium in the shape of a spot; and
   a first dichroic optical element for transmitting the second light beam from the second light source and for reflecting the first light beam from the first light source in alignment with the second light beam; and
   a second dichroic optical element for reflecting the first light beam from the first dichroic optical element to the objective lens and for refracting and reflecting the second light beam to the objective lens from the first dichroic optical element onto the same optical path as the first light beam.

2. The optical pick-up apparatus as set forth in claim 1, wherein the first dichroic optical element includes a dichroic beam splitter having a material film for reflecting the first light beam and transmitting the second light beam.

3. The optical pick-up apparatus as set forth in claim 2, wherein the second dichroic optical element includes a dichroic mirror between the dichroic beam splitter and the objective lens for compensating an aberration generated in any one of the first and second light beams.

4. The optical pick-up apparatus as set forth in claim 3, wherein the dichroic mirror includes:
   a selectively reflecting plane for reflecting one of the first and second light beams and for transmitting another; and
   an entire reflecting plane disposed to the selectively reflecting plane in parallel, the entire reflecting plane reflecting all the first and second light beams.

5. The optical pick-up apparatus as set forth in claim 3, further comprises a color filter, between the dichroic beam mirror and the objective lens, for allowing any one of the first and second light beams to have a large flux diameter.

6. The optical pick-up apparatus as set forth in claim 5, further comprises a collimator, between the dichroic optical element and the color filter, for forcing the light beams to enter toward the color filter in parallel.

* * * * *